US010939238B1

(12) United States Patent
Dosher et al.

(10) Patent No.: US 10,939,238 B1
(45) Date of Patent: *Mar. 2, 2021

(54) SYSTEMS AND METHODS FOR ESTIMATING VEHICLE SPEED AND HENCE DRIVING BEHAVIOR USING ACCELEROMETER DATA DURING PERIODS OF INTERMITTENT GPS

(71) Applicant: State Farm Mutual Automobile Insurance Company, Bloomington, IL (US)

(72) Inventors: David J. Dosher, Fitchburg, WI (US); Scott T. Christensen, Salem, OR (US); Sunish Shreenarayan Menon, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/966,209

(22) Filed: Apr. 30, 2018

Related U.S. Application Data (63) Continuation of application No. 15/164,499, filed on May 25, 2016, now Pat. No. 10,026,131, which is a
(Continued)

(51) Int. Cl.
*H04W 4/02* (2018.01)
*G01S 19/20* (2010.01)
(Continued)

(52) U.S. Cl.
CPC ............ *H04W 4/027* (2013.01); *G01S 19/20* (2013.01); *G07C 5/008* (2013.01); *G07C 5/0808* (2013.01);
(Continued)

(58) Field of Classification Search
CPC .......... G06Q 40/08; G07C 5/00; G07C 5/008; G07C 5/02; G07C 5/08; G07C 5/0816;
(Continued)

(56) References Cited

U.S. PATENT DOCUMENTS 5,923,286 A 7/1999 Divakaruni
5,969,672 A 10/1999 Brenner
(Continued)

FOREIGN PATENT DOCUMENTS

WO 2007101724 A2 9/2007

OTHER PUBLICATIONS

Park et al., Online Pose Classification and Walking Speed Estimation using Handheld Devices, Sep. 5-8, 2012, UbiComp '12 (Year: 2012).*

(Continued)

*Primary Examiner* — Thomas G Black
*Assistant Examiner* — Sara J Lewandroski
(74) *Attorney, Agent, or Firm* — Marshall, Gerstein & Borun LLP (57) ABSTRACT

A system estimates the speed of a moving vehicle and hence the driving behavior of an individual driving the vehicle using accelerometer data. To do so, the system analyzes received accelerometer data to find idling points when the vehicle is not moving during a driving session. Based on the idling points, the system may divide the driving session into two or more segments. The system may then determine the speed of the vehicle at one or more boundary points of each segment. For each segment, the system may analyze the accelerometer data to determine the acceleration of the vehicle for points when the vehicle is moving. Subsequently, the system may calculate the speed of the vehicle for the points when the vehicle is moving based on the acceleration
(Continued)

of the vehicle at the points when the vehicle is moving and the speed of the vehicle at the boundary points.

19 Claims, 3 Drawing Sheets

Related U.S. Application Data continuation of application No. 14/877,571, filed on Oct. 7, 2015, now Pat. No. 9,395,384.

(51) Int. Cl.
*G06Q 40/08* (2012.01)
*G07C 5/00* (2006.01)
*G07C 5/08* (2006.01)

(52) U.S. Cl.
CPC ......... *G07C 5/0816* (2013.01); *G07C 5/0841* (2013.01); *G06Q 40/08* (2013.01)

(58) Field of Classification Search
CPC .... G07C 5/0841; G07C 5/085; G07C 5/0858; H04W 4/02; H04W 4/025; H04W 4/026; H04W 4/027
See application file for complete search history.

(56) References Cited

U.S. PATENT DOCUMENTS

| | | | |
|---|---|---|---|
| 6,408,245 B1 | 6/2002 | An | |
| 10,140,785 B1* | 11/2018 | Cox | ................ G01F 9/02 |
| 10,429,203 B1* | 10/2019 | Brandmaier | ........... G01C 22/00 |
| 2005/0137757 A1 | 6/2005 | Phelan | |
| 2009/0138199 A1 | 5/2009 | Bonanni | |
| 2009/0318121 A1 | 12/2009 | Marumoto | |
| 2009/0322598 A1 | 12/2009 | Fly | |
| 2012/0022780 A1* | 1/2012 | Kulik | ............... G01C 25/00 |
| | | | 701/498 |
| 2013/0073112 A1 | 3/2013 | Phelan | |
| 2013/0274955 A1 | 10/2013 | Rosenbaum | |
| 2013/0302758 A1 | 11/2013 | Wright | |
| 2014/0232593 A1 | 8/2014 | Varoglu | |
| 2014/0278206 A1* | 9/2014 | Girod | ............... G01C 21/165 |
| | | | 702/141 |
| 2014/0324300 A1 | 10/2014 | Halder | |
| 2014/0372026 A1 | 12/2014 | Georgy | |
| 2015/0233718 A1* | 8/2015 | Grokop | ............... G06Q 40/08 |
| | | | 701/501 |
| 2015/0300827 A1* | 10/2015 | Malalur | .............. G01C 21/30 |
| | | | 701/410 |
| 2015/0338430 A1 | 11/2015 | Gorjestani | |
| 2015/0379410 A1* | 12/2015 | Dong | ................. G06N 7/00 |
| | | | 706/58 |
| 2016/0016590 A1* | 1/2016 | Fernandez Pozo | ... B60W 40/09 |
| | | | 702/141 |
| 2016/0171521 A1* | 6/2016 | Ramirez | ............ G06Q 10/0635 |
| | | | 701/409 |
| 2016/0327397 A1* | 11/2016 | Cordova | ............... G06Q 40/08 |
| 2017/0057518 A1* | 3/2017 | Finegold | ............... H04M 1/725 |
| 2017/0178424 A1* | 6/2017 | Wright | ................ G07C 5/02 |
| 2018/0033217 A1* | 2/2018 | Komada | .............. H04W 24/04 |
| 2018/0231577 A1* | 8/2018 | Karlsson | ................. G01P 3/54 |
| 2020/0242924 A1* | 7/2020 | Publicover | ........ G08G 1/096775 |

OTHER PUBLICATIONS

Park et al., "Online Pose Classification and Walking Speed Estimation using Handheld Devices," Sep. 5-8, 2012, UbiComp '12.

* cited by examiner

SYSTEMS AND METHODS FOR ESTIMATING VEHICLE SPEED AND HENCE DRIVING BEHAVIOR USING ACCELEROMETER DATA DURING PERIODS OF INTERMITTENT GPS

This application is a continuation application that claims priority to and the benefit of the filing date of U.S. application Ser. No. 15/164,499, filed May 25, 2016 and entitled "Systems and Methods for Estimating Vehicle Speed and Hence Driving Behavior Using Accelerometer Data During Periods of Intermittent GPS," which is a continuation application that claims priority to and the benefit of the filing date of U.S. application Ser. No. 14/877,571 (now U.S. Pat. No. 9,395,384), filed Oct. 7, 2015 and entitled "Systems and Methods for Estimating Vehicle Speed and Hence Driving Behavior Using Accelerometer Data During Periods of Intermittent GPS," the entire disclosures of which are hereby incorporated herein by reference in their entireties.

TECHNICAL FIELD

The present application relates generally to systems and methods for estimating vehicle speed and hence driving behavior during a driving session for insurance rating purposes.

BACKGROUND

Many insurance companies offer usage-based vehicle insurance where insurance ratings and premiums are determined based on a driver's vehicle usage. An important usage factor is vehicle speed or how fast the driver is driving. Various means can be used to determine the speed of a vehicle. For example, monitoring devices that interface with the on-board diagnostic port of the vehicle can be used to monitor the vehicle speed. Other systems rely on Global Positioning System (GPS) technology that is either built into the vehicle or from the use of GPS sensors on a mobile device (e.g., a smartphone). Still other systems make use of accelerometer sensors in mobile devices to estimate the speed of the vehicle. However, monitoring devices can be expensive or require expert installation, while GPS may not be available all the time or even accurate in some situations (e.g., during low speeds). Further, mobile device-based GPS can be a significant drain on the batteries of the mobile device.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for determining vehicle speed may include receiving, via a computer network, accelerometer data corresponding to a driving session of a vehicle. The method may analyze, by one or more processors, the accelerometer data received during the driving session to determine idling points when the vehicle is not moving. The method may then divide, by one or more processors, the driving session into two or more segments based on the determined idling points. For each of the two or more segments, the method may: i) determine, by one or more processors, speed of the vehicle at one or more boundary points of each segment; ii) analyze, by one or more processors, the accelerometer data to determine acceleration of the vehicle in the longitudinal direction for points when the vehicle is moving; and iii) calculate, by one or more processors, speed of the vehicle for the points when the vehicle is moving based on the acceleration of the vehicle at the points when the vehicle is moving and the speed of the vehicle at the one or more boundary points. Finally, the method may determine, by one or more processors, a driving behavior based on at least the calculated speed of the vehicle at the points when the vehicle is moving in each of the two or more segments.

A non-transitory computer-readable storage medium including computer-readable instructions to be executed on one or more processors of a computing device for determining vehicle speed. The instructions when executed, may cause the one or more processors to receive, via a computer network, accelerometer data corresponding to a driving session of a vehicle. The instructions when executed, may cause the one or more processors to analyze the accelerometer data received to determine idling points when the vehicle is not moving. The instructions when executed, may then cause the one or more processors to divide the driving session into two or more segments based on the determined idling points. For each of the two or more segments, the instructions when executed, may cause the one or more processors to: i) determine speed of the vehicle at one or more boundary points of each segment; ii) analyze the accelerometer data to determine acceleration of the vehicle in the longitudinal direction for points when the vehicle is moving; and iii) calculate speed of the vehicle for the points when the vehicle is moving based on the acceleration of the vehicle at the points when the vehicle is moving and the speed of the vehicle at the one or more boundary points. Finally, the instructions when executed, may determine a driving behavior based on at least the calculated speed of the vehicle at the points when the vehicle is moving in each of the two or more segments.

A system for determining vehicle speed may comprise a data repository and a server that includes a memory having instructions for execution on one or more processors. The instructions when executed by the one or more processors, may cause the server to receive, via a computer network, accelerometer data corresponding to a driving session of a vehicle. The instructions when executed by the one or more processors, may also cause the server to store the accelerometer data in the data repository. The instructions when executed by the one or more processors, may cause the server to analyze the accelerometer data received to determine idling points when the vehicle is not moving. The instructions when executed by the one or more processors, may then cause the server to divide the driving session into two or more segments based on the determined idling points. For each of the two or more segments, the instructions when executed by the one or more processors, may cause the server to: i) determine speed of the vehicle at one or more boundary points of each segment; ii) analyze the accelerometer data to determine acceleration of the vehicle in the longitudinal direction for points when the vehicle is moving; and iii) calculate speed of the vehicle for the points when the vehicle is moving based on the acceleration of the vehicle at the points when the vehicle is moving and the speed of the vehicle at the one or more boundary points. Finally, the instructions when executed by the one or more processors, may cause the server to determine a driving behavior based on at least the calculated speed of the vehicle at the points when the vehicle is moving in each of the two or more segments.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

For usage-based vehicle insurance, the speed of a vehicle is an important usage factor for insurance rating purposes. GPS technology is often employed to determine the speed of the vehicle. GPS is a navigation system that provides position and time information to nearly any place on Earth. By updating the position over time, GPS can also supply speed and directional information. However, due to signal obstructions, GPS may not be available all the time. Intermittent GPS refers to situations where GPS signals may be lost or appear infrequently. Further, intermittent GPS may refer to situations where there is inadequate precision. For example, if the quality of the GPS is low, then any speed calculated based the received GPS will not be accurate. In these cases, alternative methods need to be used in order to obtain information on the speed of the vehicle.

Generally speaking, the disclosed system estimates the speed of a moving vehicle during periods of intermittent GPS by using data from an accelerometer sensor that measures the acceleration of the vehicle. In this manner, the disclosed system is able to provide a reliable, accurate and efficient means for estimating vehicle speed even when there is insufficient GPS. The estimated vehicle speed can then be used to determine the driving behavior of an individual driving the vehicle for insurance rating purposes.

Figure 1:
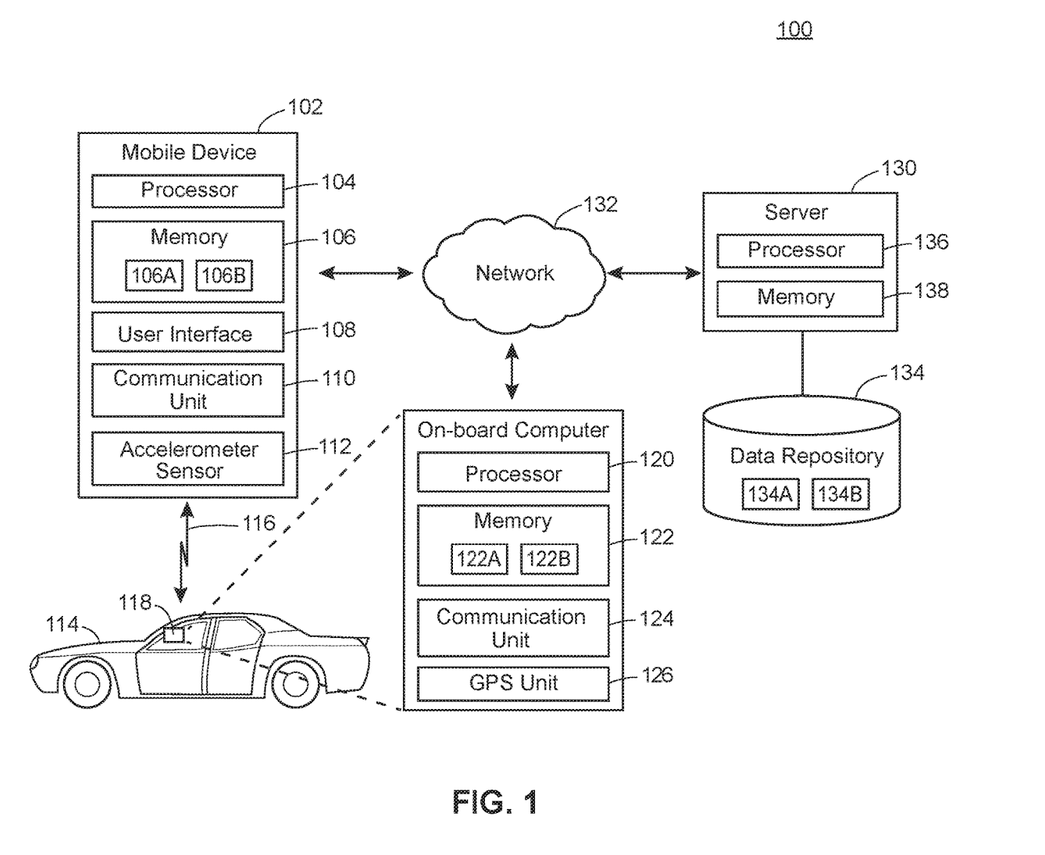
FIG. 1 is a block diagram of an example system for estimating vehicle speed and hence driving behavior using accelerometer data during periods of intermittent GPS.

Referring first to FIG. 1, which is a block diagram of an example system 100 for estimating vehicle speed and hence driving behavior using accelerometer data during periods of intermittent GPS. The example system 100 includes a mobile device 102 having a processor 104, a memory 106, a user interface 108 (e.g., a display screen, a touchscreen, a keyboard, etc.), a communication unit 110, and an accelerometer sensor 112. The mobile device 102 may be a smartphone, a tablet computer, a personal digital assistant, a wearable computer, or any other mobile computing device.

The mobile device 102 may be communicatively connected to a vehicle 114 (e.g., a car). In particular, the mobile device 102 may use the communication unit 110 to connect to the vehicle 114 over a wireless link 116. As such, the vehicle 114 may be equipped with an on-board computer 118 having a processor 120, a memory 122, an on-board communication unit 124 and a GPS unit 126. Of course, the on-board computer 118 may include or interface with other components in the vehicle 114 such as vehicle sensors (e.g., braking sensor, speedometer, etc.), speakers, displays, etc. In some embodiments, the on-board computer 118 may be installed in the vehicle 114 by the vehicle manufacturer, while in other embodiments, the on-board computer 118 may be an aftermarket on-board computer system.

Generally, the connection between the mobile device 102 and the vehicle 114 involves short range wireless communication. In the embodiment of FIG. 1, short range wireless communication may be implemented using Bluetooth, although other technologies (e.g., near field communication (NFC), radio frequency identification (RFID), etc.) can also be used. When using Bluetooth, the on-board communication unit 124 may transmit a unique identification number (e g., a media access control (MAC) address associated with the on-board computer 118 in the vehicle 114) over the wireless link 116. If the mobile device 102 is within range of the transmission, the communication unit 110 may receive the unique identification number and compare that number to a list of stored identification numbers. If a match is found, then the mobile device 102 may identify and connect to the vehicle 114. If desired, new identification numbers may be added to the list of stored identification numbers. This allows the mobile device 102 to identify and connect to new vehicles. Additionally, a user can manually connect the mobile device 102 to a particular vehicle by selecting an identification number associated with the particular vehicle from the list of stored identification numbers.

In operation, a driver may bring the mobile device 102 to the vehicle 114 when the driver decides to start a driving session (i.e., when the driver decides to drive the vehicle 114 from one location to another). Once the driver turns on the vehicle 114, the communication unit 110 of the mobile device 102 may communicate over the wireless link 116 with the on-board communication unit 124 to identify and connect to the vehicle 114 by using, for example, Bluetooth. The driver may terminate the connection between the mobile device 102 and the vehicle 114 by turning off the vehicle 114 at the end of the driving session.

During the driving session, the on-board computer 118 may activate the GPS unit 126 to acquire GPS signals used to determine the speed of the vehicle 114. The GPS signals may be acquired at regular intervals (e.g., every second) and stored as GPS data 122A in the memory 122. However, GPS signals may not be available all the time. For example, in tunnels and underground roads, GPS signals may be obstructed leading to the loss of GPS. Moreover, in certain coverage areas, GPS signals may appear infrequently or sporadically (e.g., low frequency GPS data). Thus, during the driving session, the on-board computer 118 may also communicate with the connected mobile device 102 to use the accelerometer sensor 112 to obtain acceleration/deceleration information about the vehicle 114 (from which speed can be derived). The acceleration of the vehicle 114 may be obtained at regular intervals (e.g., every second) and transmitted to the on-board computer 118 from the mobile device 102 via the wireless link 116. Once received, the on-board computer 118 may store this information as accelerometer data 122B in the memory 122. The accelerometer data 122B may be used to estimate or calculate the speed of the vehicle 114 during periods when the GPS data 122A becomes intermittent or unavailable.

The on-board computer 118 may transmit the data 122A, 122B to a server 130 via a network 132 (e.g., the Internet, a wide area network, a mobile network, a private network, etc.). The server 130 may be part of an insurance provider, for example. The server 130 may be a single server or a plurality of servers with distributed processing. A data repository 134 may be coupled to the server 130. However, in some embodiments, the data repository 134 may not be directly coupled to the server 130, but instead may be accessible by the server 130 via a network such as the network 132. Data received from the on-board computer 118 may be stored in the data repository 134 as either GPS data 134A or accelerometer data 134B depending on the type of data received. A processor 136 of the server 130 may execute instructions stored in a memory 138 of the server 130 to retrieve and analyze the data 134A, 134B in order to calculate the speed of the vehicle 114. The determined vehicle speed may be further processed by the server 130 to driving behaviors for insurance rating purposes (e.g., determine an insurance policy premium for the driver of the vehicle 114 based on how fast the driver is usually driving).

In some embodiments, the processor 120 of the on-board computer 118 may execute instructions stored in the memory 122 to process the data 122A, 122B to calculate the speed of the vehicle 114. The on-board computer 118 may then transmit the determined vehicle speed to the server 130 for subsequent use in insurance ratings.

In some embodiments, the mobile device 102 may collect and send data to the server 130. In this scenario, the mobile device 102 may acquire GPS signals from either the GPS unit 126 (sent over the wireless link 116), or a GPS sensor in the mobile device 102 (not shown). The mobile device 102 may store any obtained GPS signals as GPS data 106A in the memory 106. In addition, the mobile device 102 may store data from the accelerometer sensor 112 as accelerometer data 106B in the memory 106. The mobile device 102 may then transmit the data 106A, 106B, via the network 132, to the server 130 for storage and processing. Alternatively or additionally, the processor 104 of the mobile device 102 may execute instructions stored in the memory 106 to analyze the data 106A, 106B and determine the speed of the vehicle 114 before transmitting the determined vehicle speed to the server 130.

As can be seen from the above the discussion, the system 100 drastically improves the process by which vehicle speed is determined when GPS data is not available. For example, instead of making assumptions to guesstimate the speed of vehicle during periods when GPS is intermittent or unavailable, the system 100 can calculate the speed of the vehicle during those periods without the need for any additional computing equipment. In this manner, the resource usage or consumption of the system 100 can be greatly reduced. Further, by accurately determining the speed of the vehicle during periods with no GPS data, the system 100 can help to improve the process by which insurance ratings based on vehicle speed are determined for usage-based vehicle insurance.

Figure 2:
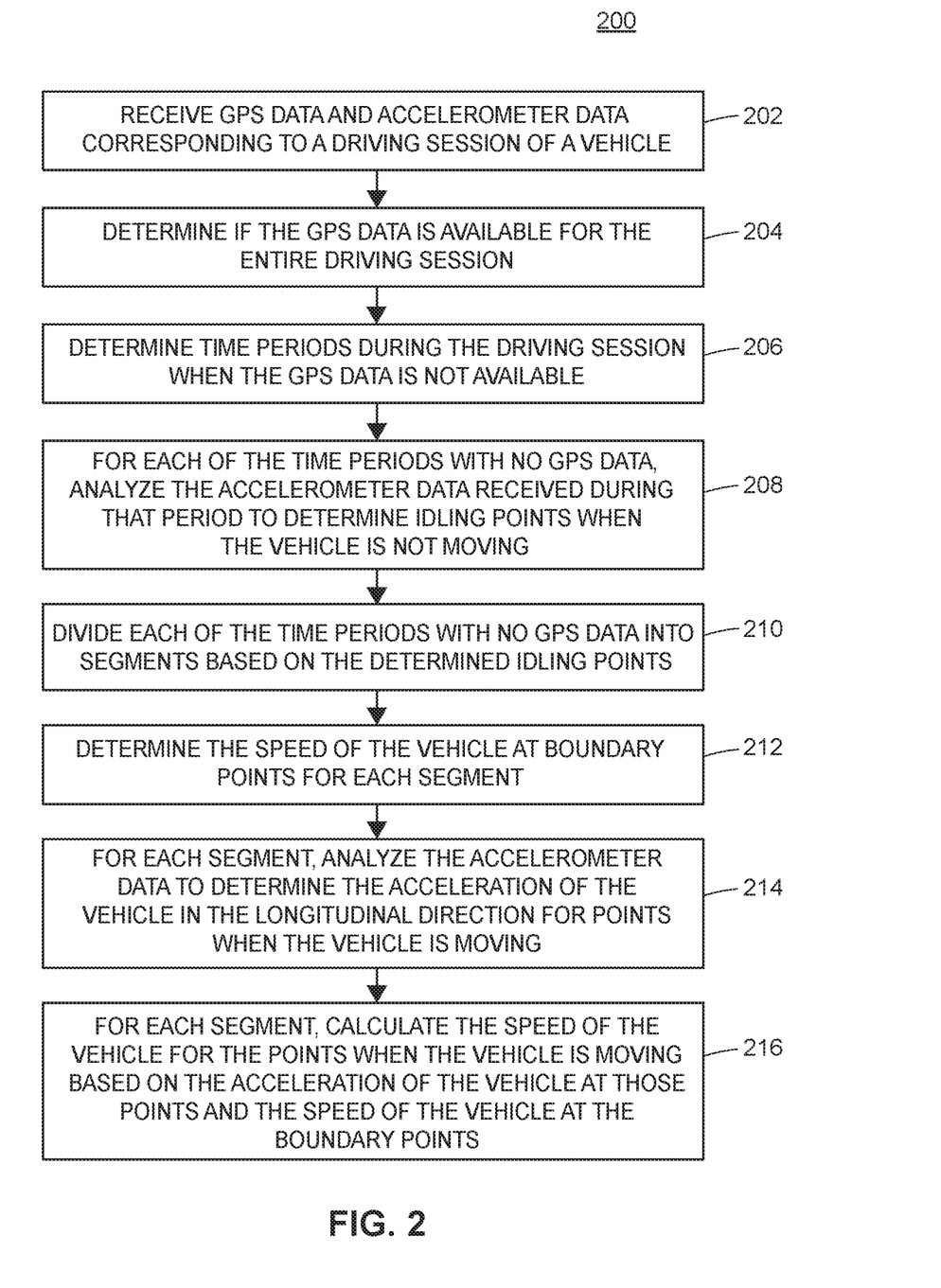
FIG. 2 is a flow diagram of an example method for estimating vehicle speed and hence driving behavior using accelerometer data during periods of intermittent GPS.

Referring now to FIG. 2, which describes a flow diagram of an example method 200 for estimating vehicle speed and hence driving behavior using accelerometer data during periods of intermittent GPS. The method 200 may include one or more blocks, routines or functions in the form of computer executable instructions that are stored in a tangible computer-readable medium (e.g., 138, 122, 106 of FIG. 1) and executed using a processor (e.g., 136, 120, 104 of FIG. 1).

The method 200 begins by receiving GPS data and accelerometer data corresponding to a driving session of a vehicle (block 202). The GPS data includes position, speed, and time information related to the movement of the vehicle during the driving session. The GPS data may be obtained from a device capable of receiving GPS signals (e.g., the GPS unit 126 of FIG. 1). The accelerometer data includes information related to the acceleration/deceleration of the vehicle during the driving session. The accelerometer data may be obtained from an accelerometer sensor in a mobile device (e.g., the accelerometer sensor 112 of FIG. 1). Generally, the GPS and accelerometer data may be received via a network (e.g., the network 132 of FIG. 1) at regular intervals (e.g., every second, every 30 seconds, every minute, etc.).

The method 200 then determines if the received GPS data is available for the entire driving session (block 204). If sufficient and accurate GPS is available throughout the driving session, then the speed of the vehicle can be determined by simply analyzing the GPS data alone. However, as discussed earlier, GPS may not be available all the time. For example, if the vehicle is traveling through a tunnel during the driving session, then GPS signals may be obstructed and lost. As a result, no GPS data will be received during the time when the vehicle is moving through the tunnel. As another example, if the vehicle is traveling in an area that has spotty GPS coverage during the driving session, then GPS signals may appear infrequently or sporadically. As a result, only a limited amount of GPS data will be received during the time when the vehicle is moving through the area of spotty coverage. As a further example, the received GPS signals may be of poor quality or inaccurate. As a result, any calculated speed based the GPS signals would be inaccurate as well. In these situations, the method 200 may determine that no GPS data is available or that the GPS data is inaccurate.

Next, the method 200 determines time periods during the driving session when the GPS data is not available (block 206). There may be one or more time periods during the driving session when the GPS data is unavailable. To determine the beginning of a particular time period, the method 200 may compare the times when the GPS data and the accelerometer data are received. For example, if no GPS data is received for several intervals but accelerometer data is still received during those intervals, then the time when the method 200 first stops receiving the GPS data may be indicative of the beginning of the particular time period when GPS data becomes unavailable. Similarly, the end of the particular time period may be determined when the method 200 again starts to receive the GPS data in conjunction with the accelerometer data.

For each of the time periods that the method 200 determines as having no GPS data, the method 200 analyzes the accelerometer data received during that period to determine idling points when the vehicle is not moving (block 208). To determine the idling points, the method 200 may utilize any of the techniques discussed in U.S. patent application Ser. No. 14/277,867, the entire disclosure of which is hereby expressly incorporated by reference herein. As a brief example, the method 200 may determine an idling point by measuring the total variance in the accelerometer data at various time stamps. Generally, accelerometers may record acceleration in three axes: x-axis (lateral), y-axis (longitudinal) and z-axis (force of gravity). The total variance is the sum of the variances from the three axes. Once the total variance is known, the method 200 may normalize the total variance at the various time stamps, and then test if the normalized total variance is below a certain threshold. If the normalized total variance at a given time stamp is below the certain threshold, then the method 200 may tag that time stamp as a vehicle idling point.

The method 200 then proceeds to divide each of the time periods that has no GPS data into segments based on the determined idling points for each time period (block 210). For example, if the method 200 did not find any idling point in block 208 for a given time period with no GPS data, then there is only one segment (i.e., the segment corresponds to the entire time period itself). In this segment, the vehicle was in constant motion and did not stop or idle at any time. On the other hand, if idling points were found for a given time period with no GPS data, then the method 200 may divide the time period based on the found idling points. In an example scenario of two idling points, the method 200 may divide the time period into three segments. The first segment may represent a time before the vehicle stopped moving at the first identified idling point. The second segment may represent a time when the vehicle was moving between the first and second identified idling points. The third segment may represent a time after the vehicle started to move again subsequent to the second identified idling point. Of course, more idling points will generate more segments that represent the movement of the vehicle before, after or between the various idling points.

The method 200 then determines the speed of the vehicle at boundary points for each segment (block 212). Generally, each segment is defined by two boundary points. Using the above example, the boundary points for the first segment may be defined by a beginning point for the time period with no GPS data (i.e., the point in which the method 200 stops receiving GPS data) and the first idling point. The boundary points for the second segment may be defined by the two identified idling points. The boundary points for the third segment may be defined by the second idling point and an end point for the time period with no GPS data (i.e., the point in which the method 200 starts to receive GPS data again). For an idling point, the speed of the vehicle may be estimated or assumed to be zero. For a beginning point of the time period with no GPS data, the speed of the vehicle may be determined by analyzing the last available GPS data that was received. Similarly, for an end point of the time period with no GPS data, the speed of the vehicle may be determined by analyzing the first available GPS data that is once again being received.

Generally, the speed of the vehicle need not be determined for all the boundary points of a given segment. In some embodiments, the speed of the vehicle may be determined at only one of the boundary points.

For each segment, the method 200 also analyzes the accelerometer data to determine the acceleration of the vehicle in the longitudinal direction for points when the vehicle is moving (block 214). Here, once a segment and its boundary points are identified, the method 200 may analyze the received or available accelerometer data for the segment to determine the acceleration of the vehicle for all points in that segment for which the vehicle is in motion.

As discussed earlier, accelerometers may record data in the x-axis for acceleration/deceleration in the lateral direction, the y-axis for acceleration/deceleration in the longitudinal direction, and the z-axis for acceleration/deceleration due to the force of gravity. Accordingly, the method 200 may analyze the accelerometer data to separate out acceleration/deceleration in the different directions. More particularly, the method 200 may determine the acceleration in the longitudinal direction as this relates to the forward (or backward) movement of the vehicle. To determine the longitudinal acceleration of the vehicle, the method 200 may utilize any of the techniques discussed in U.S. patent application Ser. No. 14/277,882, the entire disclosure of which is hereby expressly incorporated by reference herein.

For each segment, the method 200 then calculates the speed of the vehicle for the points when the vehicle is moving based on the acceleration of the vehicle at those points and the speed of the vehicle at the boundary points (block 216). In particular, the method 200 calculates the speed in each segment by solving a least-squares minimization or regression problem. To set up the analysis for the least-squares minimization problem, it is required that the speed of the vehicle is known for at least one point in each segment. For example, the speed of the vehicle should be known at one of the boundary points. However, more accurate results are obtained if the speed of the vehicle is known at two points (e.g., at both of the boundary points). This constraint anchors the speed to known values at two locations and prevents small errors in the accelerometer data from causing the calculated speed to continuously drift.

Without using a least-squares regression analysis (or some other method of minimizing the sum of the error), bad estimates of the speed may result as one moves further away from the boundary points. A least-squares regression analysis also ensures that there are not many large jumps speed values. Further, a least-squares regression analysis can provide the option of giving some accelerometer points more weight than others. For example, an average one second accelerometer reading can be given more weight depending on how many samples were retrieved during that second. When the sample rate is low (e.g., 1 Hz), less weight can be given when minimizing the error. On the other hand, when the sample rate is high (e.g., 20 Hz), more weight can be given. In this manner, outlier accelerometer reading will not affect the calculation of the speed.

Next, a time derivative matrix D is constructed such that when D is multiplied by some vector $\vec{h}$ containing a time series, $D\vec{h}$ represents the numerical time derivative of $\vec{h}$. Then letting $\vec{a}$ represent the longitudinal acceleration (as determined in block 214) and $\vec{v}$ represent the speed of the vehicle at various points in time, the sum of squared error expression $\|D\vec{v} - \vec{a}\|_2$ is minimized with respect to $\vec{v}$. The constraint that at least one element of $\vec{v}$ is known is $\vec{p}$ imposed on the least-squares minimization problem.

A typical solution for the least-squares minimization problem may involve linear constraints. In particular, a matrix Q is defined to have the same number of rows as are $\vec{v}$ with the following structure:

$$Q = \begin{pmatrix} 1 & 0 \\ 0 & 0 \\ 0 & 0 \\ \wedge & \wedge \\ 0 & 0 \\ 0 & 0 \\ 0 & 1 \end{pmatrix}.$$

Finally, by defining known speed points in a vector $$\vec{p} = \begin{pmatrix} v_{B1} \\ v_{B2} \end{pmatrix},$$

where $v_{B1}$ and $v_{B2}$ represent the known speeds at the boundary points, the method 200 can compute an analytical solution to determine the speed of the vehicle $\vec{v}$ by solving the following equation:

$$\vec{v} = (D^T D)^{-1} D^T \vec{a} - (D^T D)^{-1} Q (Q^T (D^T D)^{-1} Q^T (D^T D)^{-1} D^T \vec{a} - \vec{c}).$$

Once the speed of the vehicle is determined, the method 200 may use the determined speed for insurance rating purposes. To this effect, the method 200 may include additional blocks not shown in FIG. 2. For example, the method 200 may include a block that determines one or more driving behaviors or patterns based the determined vehicle speed and use at least this information to determine a vehicle insurance risk. Further, the method 200 may use the determined driving behaviors or patterns to determine one or more driving characteristics of a driver associated with the vehicle. The method 200 may also determine a risk level for the driver by using any of the determined driving characteristics and/or driving behaviors or patterns. The method 200 may then determine one or more insurance premiums based on the determined risk level.

Alternatively or additionally, the method 200 may receive one or more of GPS data or accelerometer data. Here, the method 200 may calculate the speed of the vehicle even when no GPS data is received. More particularly, if no GPS data is received, the method 200 may analyze the accelerometer data received during the entire driving session to determine idling points when the vehicle is not moving and then calculate the speed of the vehicle between all know idling points. In other words, GPS data is optional and the time period during which GPS is not available would be entire driving session. Of course, if GPS data is received, the method 200 may determine if the GPS data is available or accurate for the entirety of the driving session.

Using the system 100 and the method 200, the speed of a moving vehicle may be estimated or calculated using accelerometer data during periods of intermittent GPS. The determined vehicle speed can be used to determine driving behaviors for insurance rating purposes in usage-based vehicle insurance. However, applications for such systems and methods are not limited to the field of vehicle insurance. Applications in other fields or industries may include determining vehicle speed for navigation purposes, for traffic control purposes, and the like.

Figure 3:
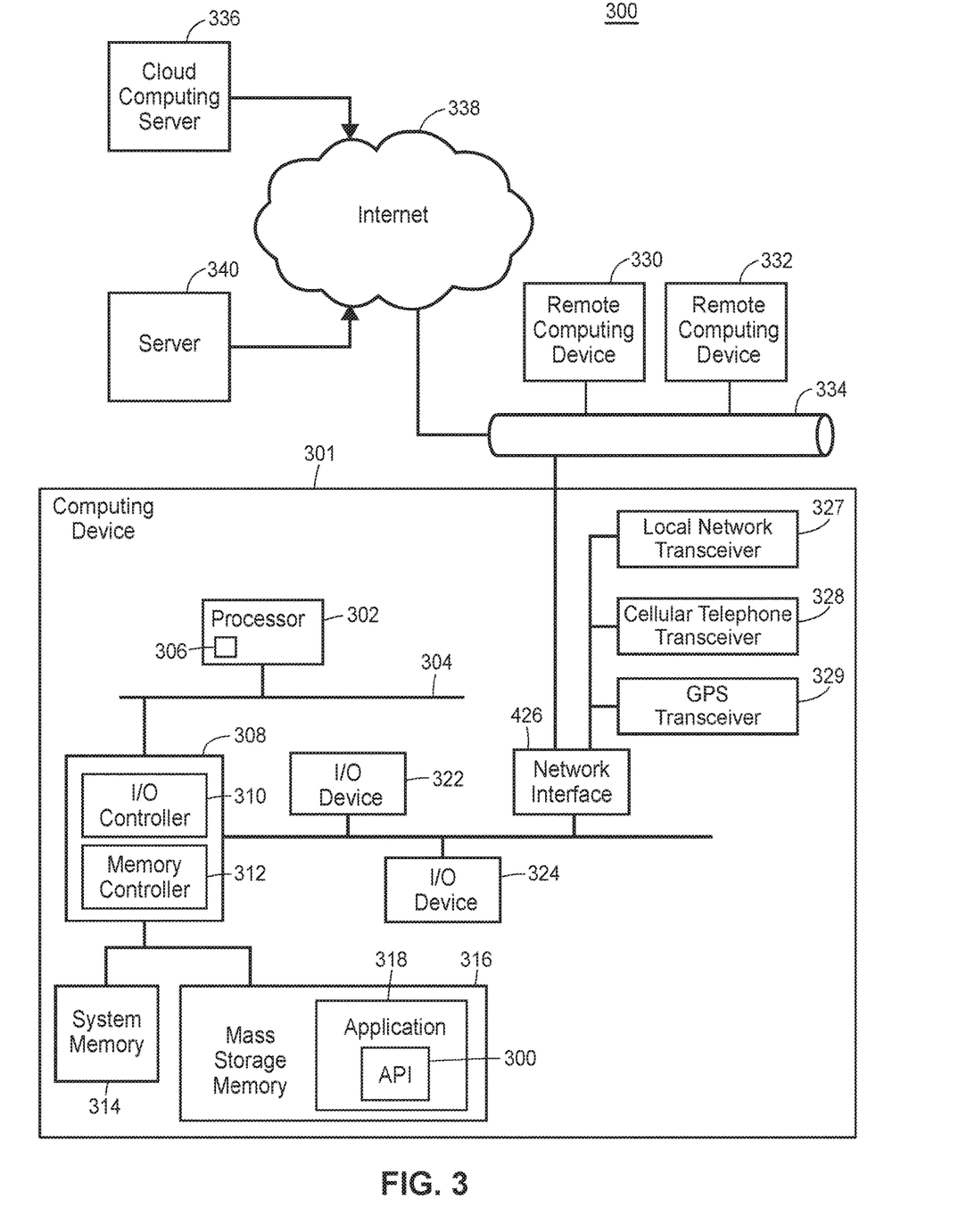
FIG. 3 is a block diagram of a computing environment that implements a system and method for estimating vehicle speed and hence driving behavior using accelerometer data during periods of intermittent GPS.

FIG. 3 is a block diagram of an example computing environment for a system 300 having a computing device 301 that may be used to implement the systems and methods described herein. The computing device 301 may be a mobile computing device (e.g., smart phone, a tablet, a Wi-Fi-enabled device, etc.), an on-board vehicle computer, or other types of computing devices. Processor systems similar or identical to the example system 300 may be used to implement and execute the example system of FIG. 1, the method of FIG. 2, and the like. Although the system 300 is described below as including a plurality of peripherals, interfaces, chips, memories, etc., one or more of those elements may be omitted from other example processor systems used to implement and execute the example system 100. Also, other components may be added.

As shown in FIG. 3, the computing device 301 includes a processor 302 that is coupled to an interconnection bus 304. The processor 302 includes a register set or register space 306, which is depicted in FIG. 3 as being entirely on-chip, but which could alternatively be located entirely or partially off-chip and directly coupled to the processor 302 via dedicated electrical connections and/or via the interconnection bus 304. The processor 302 may be any suitable processor, processing unit or microprocessor. Although not shown in FIG. 3, the computing device 301 may be a multi-processor device and, thus, may include one or more additional processors that are identical or similar to the processor 302 and that are communicatively coupled to the interconnection bus 304.

The processor 302 of FIG. 3 is coupled to a chipset 308, which includes a memory controller 310 and a peripheral input/output (I/O) controller 312. As is well known, a chipset typically provides I/O and memory management functions as well as a plurality of general purpose and/or special purpose registers, timers, etc. that are accessible or used by one or more processors coupled to the chipset 308. The memory controller 310 performs functions that enable the processor 302 (or processors if there are multiple processors) to access a system memory 314 and a mass storage memory 316, that may include either or both of an in-memory cache (e.g., a cache within the memory 314) or an on-disk cache (e.g., a cache within the mass storage memory 316).

The system memory 314 may include any desired type of volatile and/or non-volatile memory such as, for example, static random access memory (SRAM), dynamic random access memory (DRAM), flash memory, read-only memory (ROM), etc. The mass storage memory 316 may include any desired type of mass storage device. For example, if the computing device 301 is used to implement an application 318 having an API 319 (including functions and instructions as described by the method 200 of FIG. 2). The mass storage memory 316 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 301 and the system 300. Thus, a module, block, function, operation, procedure, routine, step, and method can be implemented in hardware, firmware, and/or software. In one embodiment, program modules and routines (e.g., the application 318, the API 319, etc.) are stored in mass storage memory 316, loaded into system memory 314, and executed by a processor 302 or can be provided from computer program products that are stored in tangible computer-readable storage mediums (e.g., RAM, hard disk, optical/magnetic media, etc.).

The peripheral I/O controller 310 performs functions that enable the processor 302 to communicate with peripheral input/output (I/O) devices 322 and 324, a network interface 326, a local network transceiver 327, a cellular network transceiver 328, and a GPS transceiver 329 via the network interface 326. The I/O devices 322 and 324 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 328 may be resident with the local network transceiver 327. The local network transceiver 327 may include support for a Wi-Fi network, Bluetooth, infrared or other wireless data transmission protocols. In other embodiments, one element may simultaneously support each of the various wireless protocols employed by the computing device 301. For example, a software-defined radio may be able to support multiple protocols via downloadable instructions. In operation, the computing device 301 may be able to periodically poll for visible wireless network transmitters (both cellular and local network) on a periodic basis. Such polling may be possible even while normal wireless traffic is being supported on the computing device 301. The network interface 326 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 312 and the I/O controller 310 are depicted in FIG. 3 as separate functional blocks within the chipset 308, the functions performed by these blocks may be integrated within a single integrated circuit or may be implemented using two or more separate integrated circuits. The system 300 may also implement the application 318 on remote computing devices 330 and 332. The remote computing devices 330 and 332 may communicate with the computing device 301 over an Ethernet link 334. In some embodiments, the application 318 may be retrieved by the computing device 301 from a cloud computing server 336 via the Internet 338. When using the cloud computing server 336, the retrieved application 318 may be programmatically linked with the computing device 301. The application 318 may be a Java® applet executing within a Java® Virtual Machine (JVM) environment resident in the computing device 301 or the remote computing devices 330, 332. The application 318 may also be "plug-ins" adapted to execute in a web-browser located on the computing devices 301, 330, and 332. Further, the application 318 may be adapted to execute in a web-browser using JavaScript. In some embodiments, the application 318 may communicate with a back-end component 340 such as the server 130 via the Internet 338.

The system 300 may include but is not limited to any combination of a LAN, a MAN, a WAN, a mobile, a wired or wireless network, a private network, or a virtual private network. Moreover, while only two remote computing devices 330 and 332 are illustrated in FIG. 3 to simplify and clarify the description, it is understood that any number of client computers are supported and can be in communication within the system 300.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term ". coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for estimating vehicle speed and hence driving behavior using accelerometer data during periods of intermittent GPS for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for estimating vehicle speed and hence driving behavior using accelerometer data during periods of intermittent GPS through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for determining vehicle speed when GPS (Global Positioning System) data is unavailable or inaccurate, the method comprising:
   receiving, at a mobile device via a computer network, GPS data obtained by an on-board vehicle computer corresponding to a driving session of a vehicle;
   determining, by one or more processors, whether the GPS data was available and accurate for the entire driving session;
   determining, by one or more processors, one or more time periods during the driving session when the GPS data was unavailable or inaccurate;
   identifying, at the mobile device, accelerometer data obtained by the mobile device corresponding to the one or more time periods during which the GPS data obtained by the on-board vehicle computer was unavailable or inaccurate; and
   for each respective time period of the one or more time periods:
      analyzing, by one or more processors, the accelerometer data obtained by the mobile device during the respective time period to determine one or more idling points when the vehicle is not moving,
      dividing, by one or more processors, the respective time period into two or more segments based upon the determined one or more idling points, and
      for each respective segment from the two or more segments, determining, by one or more processors, a speed of the vehicle at one or more boundary points of the respective segment, to facilitate estimating vehicle speed at points having intermittent GPS data.

2. The computer-implemented method of claim 1, the method further comprising:
   for each respective segment from the two or more segments, analyzing, by one or more processors, the accelerometer data to determine an acceleration of the vehicle in the longitudinal direction for points when the vehicle is moving.

3. The computer-implemented method of claim 2, the method further comprising:

for each respective segment from the two or more segments, calculating, by one or more processors, a speed of the vehicle for the points when the vehicle is moving based upon (i) the determined acceleration of the vehicle at the points when the vehicle is moving, and (ii) the speed of the vehicle at the one or more respective boundary points of the respective segment.

4. The computer-implemented method of claim 3, the method further comprising:
determining, by one or more processors, a driving behavior based upon at least the calculated speed of the vehicle at the points when the vehicle is moving in each of the two or more segments.

5. The computer-implemented method of claim 3, further comprising determining, by one or more processors, a vehicle insurance risk using at least the calculated speed of the vehicle at the points when the vehicle is moving in each of the two or more segments.

6. The computer-implemented method of claim 5, wherein the accelerometer data is derived from an accelerometer sensor in the mobile device connected to the vehicle that measures the acceleration of the vehicle.

7. The computer implemented method of claim 3, wherein calculating the speed of the vehicle for the points when the vehicle is moving further comprises using a least-squares minimization or regression analysis.

8. The computer-implemented method of claim 1, wherein the accelerometer data is derived from an accelerometer sensor in a mobile device connected to the vehicle that measures the acceleration of the vehicle.

9. A non-transitory computer-readable storage medium including computer-readable instructions to be executed on one or more processors of a computing device, the instructions when executed causing the one or more processors to:
receive, at a mobile device via a computer network, GPS data obtained by an on-board vehicle computer corresponding to a driving session of a vehicle;
determine whether the GPS data was available and accurate for the entire driving session;
determine one or more time periods when the GPS data was unavailable or inaccurate;
identify, at the mobile device, accelerometer data obtained by the mobile device corresponding to the one or more time periods during which the GPS data obtained by the on-board vehicle computer was unavailable or inaccurate; and
for each respective time period of the one or more time periods:
analyze the accelerometer data obtained by the mobile device during the respective time period to determine one or more idling points when the vehicle is not moving,
divide the respective time period into two or more segments based upon the determined one or more idling points, and
for each respective segment from the two or more segments, determine a speed of the vehicle at one or more boundary points of the respective segment, to facilitate determining vehicle speed when GPS data is intermittent.

10. The non-transitory computer-readable storage medium of claim 9, wherein the accelerometer data is derived from an accelerometer sensor in the mobile device connected to the vehicle that measures the acceleration of the vehicle.

11. The non-transitory computer-readable storage medium of claim 9, further comprising instructions that, when executed, cause the one or more processors to, for each respective segment from the two or more segments, analyze the accelerometer data to determine the acceleration of the vehicle in the longitudinal direction for points when the vehicle is moving.

12. The non-transitory computer-readable storage medium of claim 11, further comprising instructions that, when executed, cause the one or more processors to, for each respective segment from the two or more segments, calculate the speed of the vehicle for the points when the vehicle is moving based upon (i) the acceleration of the vehicle at the points when the vehicle is moving, and (ii) the speed of the vehicle at the one or more respective boundary points.

13. The non-transitory computer-readable storage medium of claim 12, further comprising instructions that, when executed, cause the one or more processors to determine a vehicle insurance risk using at least the calculated speed of the vehicle at the points when the vehicle is moving in each of the two or more segments.

14. The non-transitory computer-readable storage medium of claim 12, further comprising instructions that, when executed, cause the one or more processors to determine a driving behavior based upon at least the calculated speed of the vehicle at the points when the vehicle is moving in each of the two or more segments.

15. The non-transitory computer-readable storage medium of claim 12, wherein the accelerometer data is derived from an accelerometer sensor in the mobile device connected to the vehicle that measures the acceleration of the vehicle.

16. A system for determining vehicle speed when GPS (Global Positioning System) data is unavailable or inaccurate, the system comprising:
a mobile computing device, including a memory having instructions for execution on one or more processors, wherein the instructions, when executed by the one or more processors, cause the mobile device to:
receive, via a computer network from an on-board vehicle computer, GPS data obtained by the on-board vehicle computer corresponding to a driving session of a vehicle;
determine whether the GPS data was available and accurate for the entire driving session;
determine one or more time periods when the GPS data was unavailable or inaccurate;
identify accelerometer data obtained by the mobile device corresponding to the one or more time periods during which the GPS data obtained by the on-board vehicle computer was unavailable or inaccurate; and
for each respective time period of the one or more time periods:
analyze the accelerometer data received during the respective time period to determine one or more idling points when the vehicle is not moving,
divide the respective time period into two or more segments based upon the determined one or more idling points, and
for each respective segment from the two or more segments, determine a speed of the vehicle at one or more boundary points of the respective segment, to facilitate determining vehicle speed when GPS data is intermittent.

17. The system of claim 16, wherein the instructions of the mobile device, when executed by the one or more processors, further cause the one or more processors to, for each respective segment from the two or more segments, analyze the accelerometer data to determine the acceleration of the vehicle in the longitudinal direction for points when the vehicle is moving.

18. The system of claim 17, wherein the instructions of the mobile device, when executed by the one or more processors, cause the one or more processors to, for each respective segment from the two or more segments, calculate the speed of the vehicle for the points when the vehicle is moving based upon (i) the acceleration of the vehicle at those points, and (ii) the speed of the vehicle at the one or more respective boundary points.

19. The system of claim 18, wherein the instructions of the mobile device, when executed by the one or more processors, cause the one or more processors to determine a vehicle insurance risk using at least the calculated speed of the vehicle at the points when the vehicle is moving in each of the two or more segments.

* * * * *